United States Patent [19]

Silberschlag

[11] 3,819,015
[45] June 25, 1974

[54] FLOATING CALIPER DISC BRAKE
[75] Inventor: Russell E. Silberschlag, Glen Ellyn, Ill.
[73] Assignee: Borg-Warner Corporation, Chicago, Ill.
[22] Filed: Feb. 1, 1973
[21] Appl. No.: 328,827

[52] U.S. Cl............... 188/73.3, 188/71.9, 188/72.7, 188/72.9, 188/76
[51] Int. Cl............................................. F16d 55/30
[58] Field of Search ....... 188/73.3, 72.6, 72.9, 71.9, 188/72.7, 76

[56] References Cited
UNITED STATES PATENTS

| 2,820,530 | 1/1958 | Chouings et al.................. | 188/72.6 |
| 3,123,183 | 3/1964 | Page .................................. | 188/72.9 |
| 3,134,459 | 5/1964 | Barnett et al...................... | 188/72.4 |
| 3,155,195 | 11/1964 | Browerman......................... | 188/71.9 |
| 3,291,262 | 12/1966 | Rosanowski et al............... | 188/73.3 |
| 3,321,050 | 5/1967 | Press................................. | 188/71.9 |
| 3,358,793 | 12/1967 | Hollnagel et al.................. | 188/73.3 |
| 3,545,573 | 12/1970 | Barton............................... | 188/72.9 |
| 3,659,681 | 5/1972 | Harvey.............................. | 188/72.9 |

FOREIGN PATENTS OR APPLICATIONS

| 883,624 | 10/1971 | Canada............................. | 188/72.9 |

Primary Examiner—George E. A. Halvosa
Attorney, Agent, or Firm—Donald W. Banner

[57] ABSTRACT

A caliper disc brake unit is provided with mounting means which anchor the unit in one plane while permitting floating movement in two other mutually perpendicular planes in order to follow any wobbling that might occur in a rotary member with which the brake is engaged. The unit is also provided with self-adjusting means which compensates for wear of the friction pads. Adjustment of the friction pads occurs in response to overtravel of the apply mechanism.

5 Claims, 8 Drawing Figures

PATENTED JUN 25 1974 3,819,015

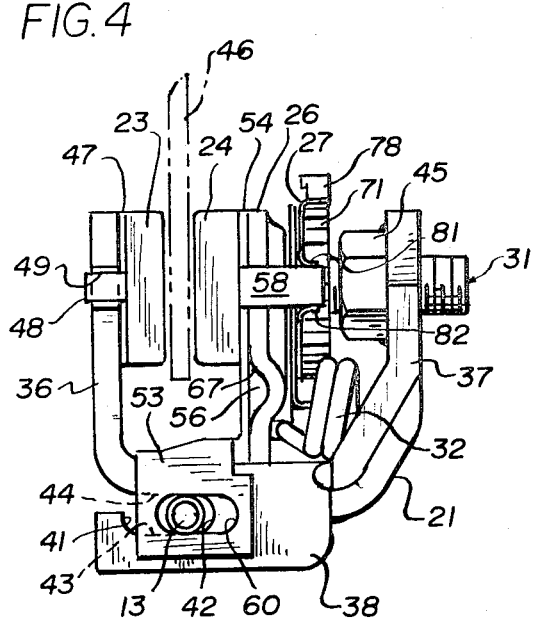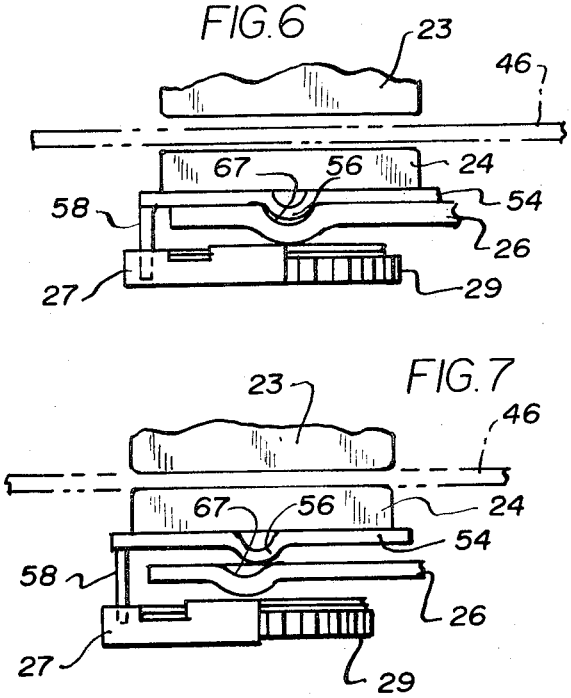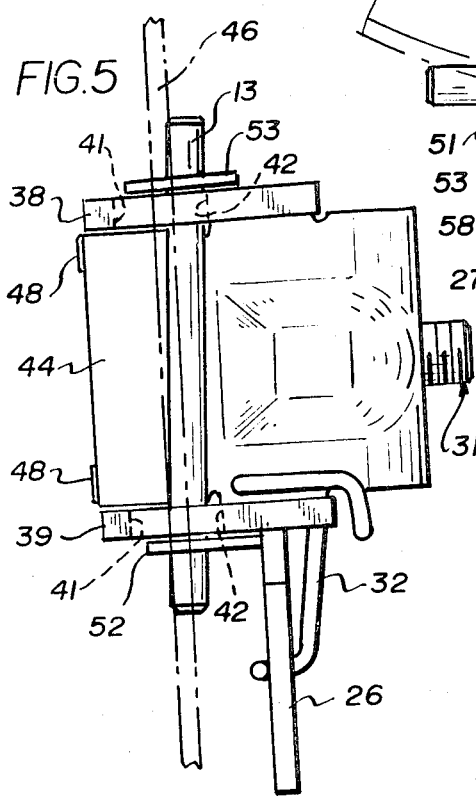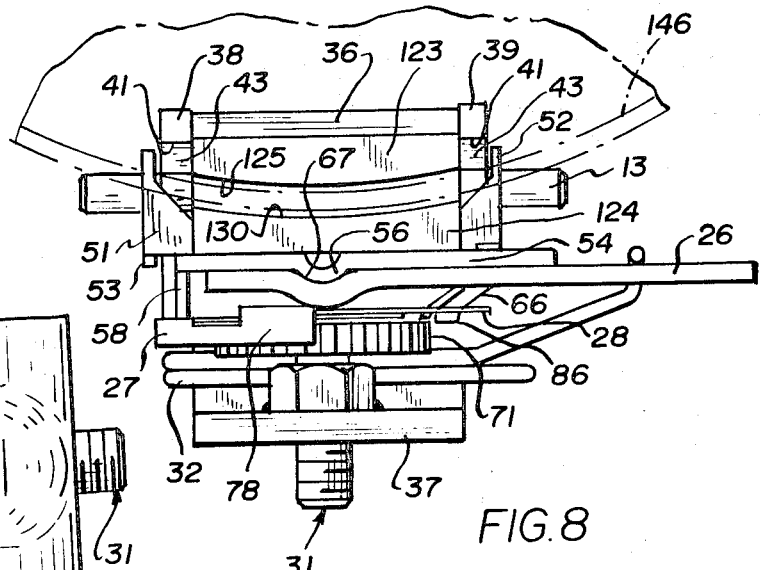

FLOATING CALIPER DISC BRAKE

BACKGROUND OF THE INVENTION

The present invention resides in the field of spot type disc brakes, and is concerned with applications of such brakes where it is desired to provide a brake for gripping a flange or rim portion of a rotary member for applying a retarding force thereto.

SUMMARY OF THE INVENTION

A principle object of the present invention is to provide an improved spot type disc brake for gripping a flange or rim of a rotatable member which is specially adapted for floating on its mountings in order to accommodate axial and wobbling or undulating movement of the braked member. In addition, the brake unit includes self adjusting means arranged to compensate for wear of the friction pads. These and other objects and advantages of the invention will become more apparent from consideration of the following description together with the drawings.

BRIEF DESCRIPTION OF THE DRAWINGS

FIG. 4 is an end view of the brake unit shown in FIG. 1;

FIG. 5 is a bottom view of the brake unit shown in FIG. 1;

FIGS. 6 and 7 are fragmentary views illustrating the released and applied condition of a camming mechanism for actuating a friction pad; and FIG. 8 is a view similar to FIG. 2 showing an alternate form of friction pad.

DESCRIPTION OF THE PREFERRED EMBODIMENT

Figure 2:
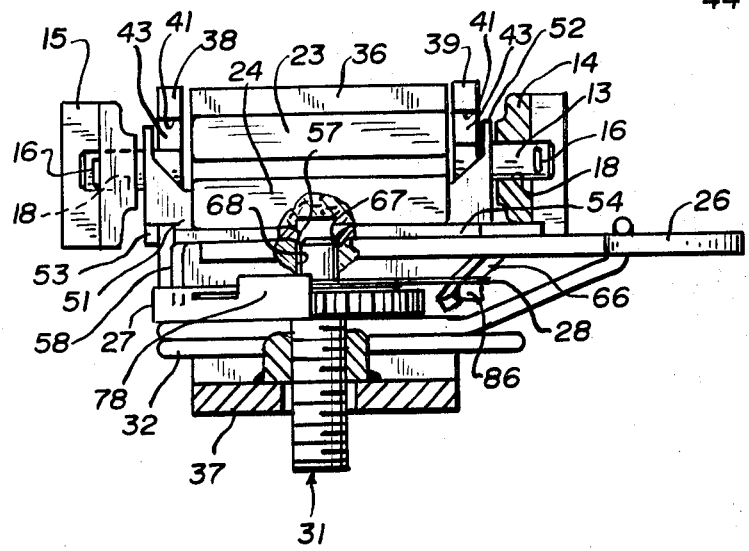
FIG. 2 is a plan view of the brake unit of FIG. 1 showing an alternate mounting arrangement.

Referring in more detail to the drawings, the reference character 10 indicates a brake unit according to the present invention. The unit can be mounted on a portion of a body 11 by means of a bracket 12 and mounting pin 13. Mounting pin 13 engages portions of the frame of the brake unit to provide anchoring means capable of resisting movement of the unit in one plane while permitting movement in two other mutually perpendicular planes. An alternate form of mounting is shown in FIG. 2, where mounting pin 13 is secured in ears 14, 15 which can be formed as integral portions of the body if desired. In either case, pin 13 is received within a pair of spaced apertures such as 18 and secured against movement with respect to the body by means of cotter pins 16 which engage bracket 12 or ears 14, 15. The pin 13 may be secured by other known forms of fastening means if desired. Where a bracket 12 is employed in the mounting assembly, it can be secured to the body by cap screws 17.

The brake unit 10 includes a frame member 21, a saddle member 22, a pair of friction pads 23, 24, or 123, 124, an apply lever 26, a pair of pawl members 27, 28, a ratchet wheel 29, and an adjustable post 31. A return spring 32 may be included, if desired.

Frame member 21 includes a base portion 35, a pair of spaced side wall portions 36, 37 extending from respective side edges of base portion 35, and a pair of endwall portions 38, 39 running transversely of frame 21 extending from respective end edges of base portion 35. Sidewall portion 36 has a friction pad 23 secured thereto as by bonding, for example. An alternative mounting for friction pad 23 is illustrated in FIGS. 4 and 5 wherein the pad 23 is secured to a backing member 47 which in turn is fastened to sidewall 36 by means of tab portions 48 engaged with slots 49 in sidewall 36. The other sidewall 37 is provided with an internally threaded nut portion 45 for receiving the post 31. Each endwall portion 38, 39 includes an elongated transversely extending guideway defined by the surfaces 41, 42, 43 and the bottom surface 44 of base portion 35. As can be seen more readily from inspection of FIGS. 4 and 5, the pin 13 is received within the guideways defined by surfaces 41, 42, 43, 44. The engagement of pin 13 with the surfaces of the guideway substantially prevents movement of frame 21 in a direction toward and from surfaces 43, 44, that is to say in a plane parallel to sidewall portions 36, 37. On the other hand, frame 21 is allowed to move in a direction toward and from surfaces 41 and 42, that is to say in a plane parallel to surface 44 of base portion 35. Movement of frame 21 in a plane parallel to base portion 35 may be a transverse lateral movement, or may be cocked with respect to pin 13 as depicted in FIG. 5. Frame 21 may also pivot about the axis of pin 13 in a plane parallel to endwall portions 38, 39. The unit is thus restrained in one plane while being permitted to move in two other mutually perpendicular planes.

The guideway defined by surfaces 41, 42, 43, 44 provides an important advantage of the present invention inasmuch as it permits body shifting of frame 21 with respect to vehicle body 11 while friction pads 23, 24 are engaged with a flange portion 46 of a rotatable member. Provision for transverse body movement of frame 21 is desirable in order to permit movement of friction pad 23 into gripping engagement with flange portion 46. A further reason for providing for movement of frame 21 arises from the fact that flange portion 46 may wobble or undergo nutation with respect to body 11 as where it is connected to a portion of a drive train which is resiliently mounted on the body. In such cases the brake unit is permitted to float with respect to the body in order to follow movements of the flange 46 while the friction pads are engaged therewith.

Saddle member 22 includes a bridge portion 51, a pair of leg portions 52, 53 extending downwardly from respective ends of the bridge portion, and a panel portion 54 extending upwardly from a side edge of the bridge portion. Panel portion 54 includes a ridge portion 56 extending upwardly approximately midway between the leg portions. An aperture 57 extends through ridge portion 56 providing clearance around an end of adjustable post 31. A tongue portion 58 extends perpendicularly from panel portion 54 toward sidewall 37. The friction pad 24 is secured to panel portion 54 of saddle member 22. Leg portion 52 includes a transversely extending elongated slot 59, and leg portion 53 includes a similar slot 60. The slots 59 and 60 are formed with a length and height sufficient to receive pin 13 and permit transverse movement of saddle 22 with respect to the pin while restricting vertical movement thereof with respect to the pin. The slots 59 and 60 are located in respective leg portions 52, 53 such that the bridge portion 51 of saddle member 22 lies above the upper surface of base portion 35 permitting relative transverse movement between saddle 22 and frame 21 when the saddle and frame are mounted on pin 13. In addition, the slots permit the saddle to follow the movement of the frame when the friction pads are engaged with the flange of the rotary members.

Apply lever 26 may include apertures such as 62, 63, 64 if desired. Such apertures provide means for attaching a return spring, and remote operating mechanism to the apply lever. A tongue 66 extends from lever 26 toward sidewall 37. Lever 26 is provided with camming surface 67 engaged with ridge portion 56 of saddle 22. An aperture 68 extending through camming surface 67 provides means for pivotally mounting lever 26 on an adjustable post 31. Pivotal movement of lever 26 about the axis of post 31 results in relative sliding movement between camming surface 67 and ridge portion 56 which in turn results in transverse movement of saddle member 22 toward sidewall 36. Such transverse movement of saddle member 22 results in movement of friction pad 24 toward friction pad 23 for gripping the flange portion 46 of a rotatable member and applying a braking force thereto.

Ratchet wheel 29 is provided with a plurality of teeth 71 around the perimeter thereof. Ratchet wheel 29 is secured both axially and rotationally to an inner portion 72 of post 31. Rotation of the ratchet wheel rotates a threaded portion 73 of post 31 in threaded nut 45, causing the ratchet wheel to move transversely toward or from sidewall 37. The threaded post 31 and ratchet wheel 29 provide an adjustable stop for regulating the spacing between saddle member 22 and sidewall portion 37 inasmuch as the saddle member, lever, pawl members and ratchet wheel are arranged in serial engagement. Thus rotation of ratchet wheel 29 is effective to determine the initial spacing between friction pads 23, and 24 providing means for compensating for wear of the friction pads.

Pawl members 27 and 28, as shown in the drawings, are identical in shape, however in assembly, they are rotated approximately opposite to each other and are secured to different members of the brake unit. Each of pawls 27, 28 is formed of sheet metal and provided with respective apertures 76, 77 forming a pivotal support about inner portion 72 of post 31. Pawl member 27 includes a pawl finger 78 having an end 79 in one way engaging contact with teeth 71 of ratchet wheel 29. The length and thickness of finger 78 is selected such that the end 79 will ride resiliently over a tooth 71 when ratchet wheel 29 is rotated in the clockwise direction as viewed in FIG. 1, but such as to possess sufficient stiffness to prevent counterclockwise rotation of the ratchet wheel. Pawl member 27 also includes a slot defined by the bent portions 81, 82 which slidably engage tongue portion 58 of saddle member 22. Pawl member 27 is thus prevented from rotation about the axis of post 31 since it is grounded to saddle member 22, however it does not interfere with the transverse movement of the saddle due to the sliding engagement between the bent portions 81, 82 and the tongue portion 58.

Pawl member 28 includes a similar pawl finger 83 and end 84 engaging others of teeth 71 on ratchet wheel 29. Pawl member 28 also includes a slot defined by a pair of bent portions 86, 87 engaging tongue 66 of lever 26.

Figure 1:
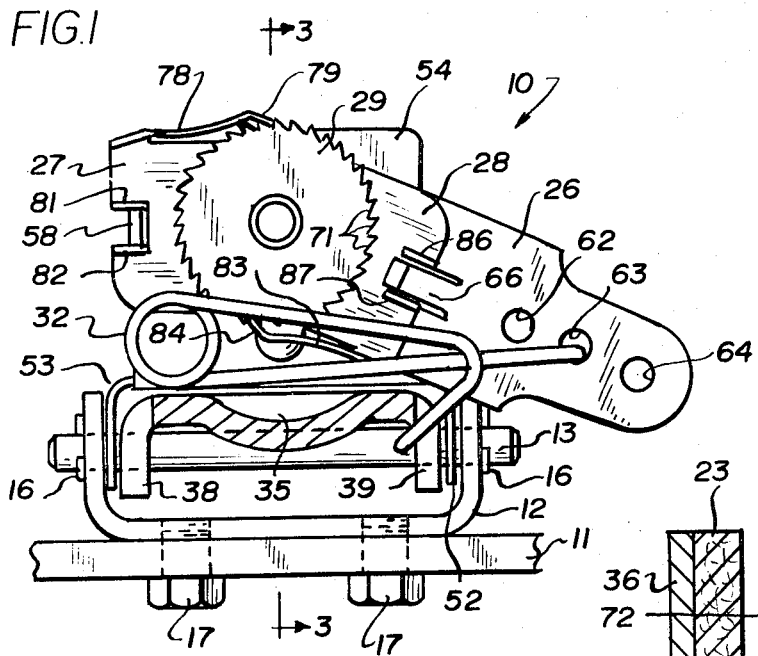
FIG. 1 is an elevation view of a brake unit according to the present invention having a sidewall thereof broken away to reveal elements of a wear adjusting mechanism.
Figure 3:
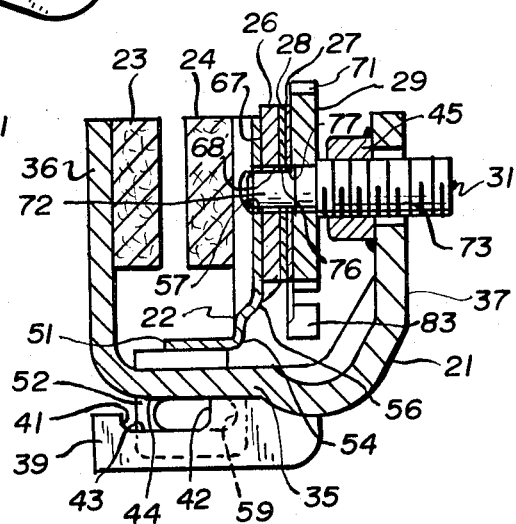
FIG. 3 is a fragmentary section view taken along the line 3—3 of FIG. 1.

The adjustable post 31, ratchet wheel 29, lever 26 and pawl members 27, 28 cooperate to adjust for wear of friction pads 23, 24 in response to overtravel of pad 24 during engagement. For example, if the proportions of ridge 56 and camming surface 67 are selected to provide full transverse movement of saddle 22 in response to something in excess of 10° of pivotal movement of lever 26, and if the teeth 71 of ratchet wheel 29 are spaced about 10° apart, then anytime the lever is required to exceed 10° of pivotal movement in order to apply the brakes, the adjustable post is rotated to compensate for wear of the pads. As seen in FIG. 1, if lever 26 is pivoted in the counterclockwise direction, the ratchet wheel 29 is prevented from rotation by means of pawl finger end 79. If the counterclockwise movement of lever 26 exceeds ten degrees, the pawl finger end 84 rides over one of the teeth 71 and engages the next. Then as lever 26 returns to its initial position, the pawl finger end 84 causes ratchet wheel 29 to rotate approximately 10° or one tooth space in the clockwise direction. Clockwise rotation of ratchet wheel 29 causes adjusting post 31 to turn in nut 45 thereby urging the lever and saddle transversely away from sidewall portion 37 and decreasing the space between friction pads 23, 24. A return spring 32 may be employed, if desired, to assure that lever 26 returns its initial position after an apply force has been removed. The return spring 32 is not required where an apply mechanism is effective to return the lever following an application of the brakes.

Turning now to FIGS. 6 and 7, the cooperation of the ridge 56 and camming surface 67 is shown more clearly. FIG. 6 illustrates the released condition in which lever 26 is in its initial position as shown in FIG. 1. In the released condition, ridge 56 is nested in camming surface 67 providing sufficient clearance between pads 23 and 24 to permit unimpeded rotation of member 46.

FIG. 7 illustrates the actuated condition in which lever 26 has been pivoted in a counterclockwise direction from the position shown in FIG. 1. In the actuated condition, camming surface 67 is caused to ride up on the surface of ridge portion 56 forcing friction pad 24 transversely toward friction pad 23 for gripping the rotatable member 46 in order to apply a braking force thereto.

FIG. 8 illustrates a modification of the brake unit shown in FIG. 2 wherein friction pads 123, 124 are provided with contoured faces 125, 130 for gripping an alternate form of flanged rotatable member 146. Where appropriate modification of the friction pad contours is made, the basic brake unit can be used with various types of rotatable members, such as discs, rims and V-pulleys.

The above description refers to a preferred embodiment of the invention in a floating caliper brake unit together with modifications thereof affording means for application of the unit to various rotary devices. The above described brake unit is particularly useful for recreational vehicles such as bicycles, motorcycles, snowmobiles and All Terrain Vehicles, but is not restricted to such applications since the principles set forth herein may be applied to other applications where it is desired to apply a braking force to a rotary member.

What we claim is:

1. A caliper brake unit for selectively gripping a flange portion of a rotatable member, said unit including a mounting pin having spaced bearing portions thereof disposed adjacent an edge of said flange portion, a frame member having a base portion and a pair of spaced sidewall portions extending parallel to said flange, a pair of friction pads mounted between said sidewall portions defining a space therebetween for receiving said flange portion of said rotatable member, said friction pads being mounted for relative movement toward and from each other for gripping and releasing said flange portion, said frame member including improved mounting means comprising a pair of longitudinally spaced endwall portions extending from respective end edges of said base portion transversely of said flange, each of said endwall portions including an elongated guideway defining a pair of slots extending transversely of said frame member, said slots loosely embracing respective of said spaced bearing portions of said mounting pin and arranged for permitting turning of said frame in a plane parallel to said base portion while resisting movement of said frame member in a plane perpendicular to said base portion.

2. A caliper brake unit according to claim 1, wherein one of said friction pads is secured to one of said sidewall portions of said frame, the other of said friction pads being secured to a saddle member, said saddle member having a pair of longitudinally spaced transversely extending leg portions adapted for engagement with said spaced bearing portions independently of said frame member end walls.

3. A caliper brake unit according to claim 2, wherein said saddle member includes an elongated ridge portion, said brake unit including a pivotally mounted lever disposed between said saddle member and the other of said sidewall portions, said lever including an elongated camming surface engaging said ridge portion, said ridge portion and camming surface being effective to displace said saddle member with respect to said other sidewall portion in response to pivotal movement of said lever.

4. A caliper brake unit according to claim 3, wherein said brake unit includes a rotatable threaded post having a threaded portion engaged with a threaded portion of said other sidewall portion, and having an inner portion extending toward said saddle member, said post providing means for adjusting the spacing of said lever from said other sidewall.

5. A flange brake unit according to claim 4, wherein said threaded post includes a ratchet wheel secured thereto adjacent said inner portion, said brake unit including a pair of pawl members, one of said pawl members being nonrotatably mounted on said saddle member and engaged with said ratchet wheel to prevent rotation of said post in one direction, the other of said pawl members being anchored on said lever and engaged with said ratchet wheel for turning said post in response to pivotal overtravel of said lever.

* * * * *